United States Patent Office 3,180,234
Patented Apr. 27, 1965

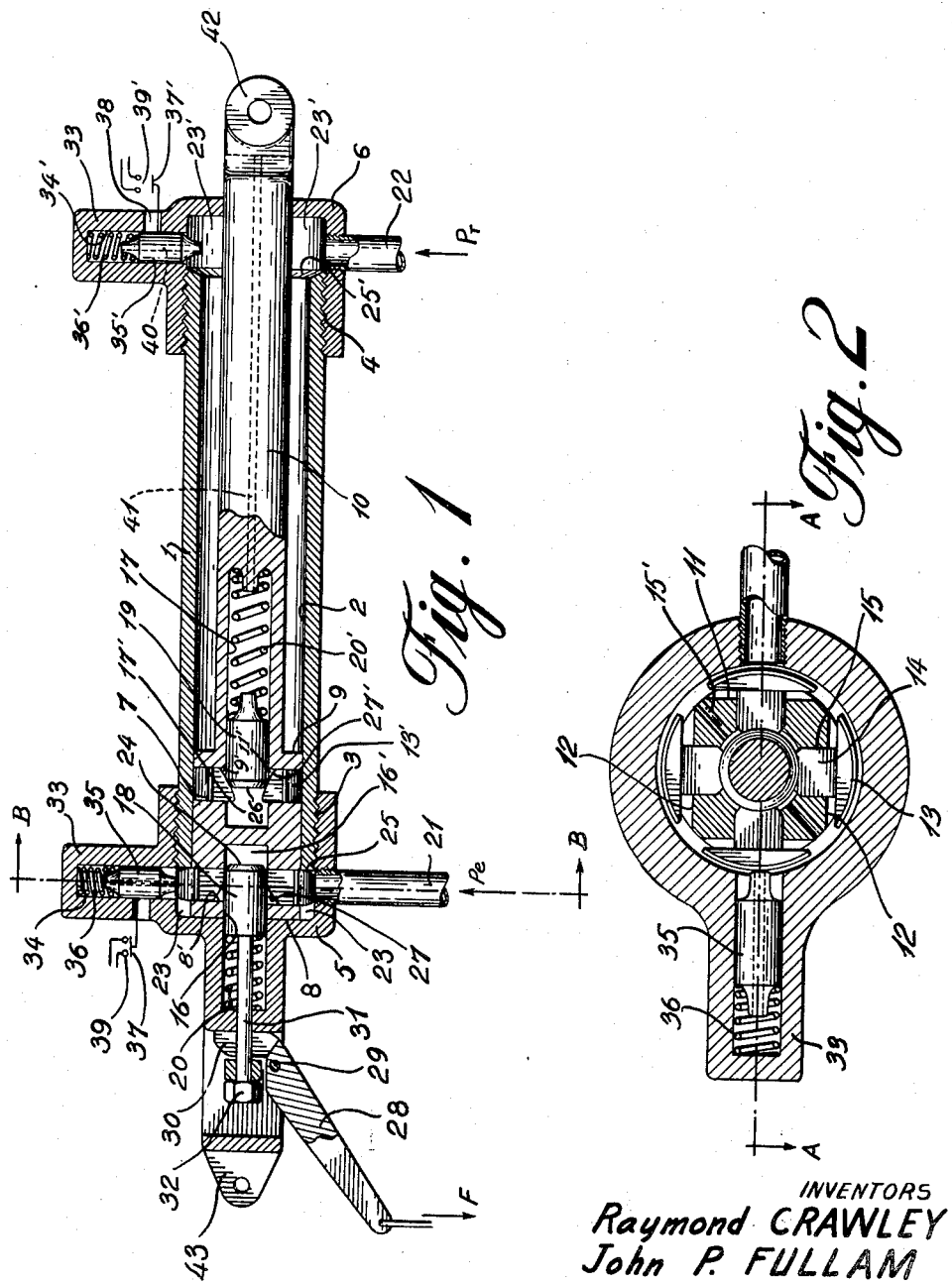

3,180,234
DUAL-POSITION LOCKABLE ACTUATOR
Raymond Crawley, Pierrefonds, Quebec, and John Peter Fullam, Baie d'Urfe, Quebec, Canada, assignors to Jarry Hydraulics Limited, Montreal, Quebec, Canada
Filed July 25, 1963, Ser. No. 297,526
5 Claims. (Cl. 92—5)

This invention relates to a dual-position fluid-operated linear actuator, and more particularly to a double-acting fluid-motor which is lockable in either retracted or extended position following a power stroke, whereby the fluid supply need not be maintained.

Actuators of the character above described are used in the aircraft industry, for lowering and raising landing gear, opening bomb-bays, hoisting loading-pallets for transport aircraft and the like. Such actuators are basically the same as those used in hydraulic fork-lift trucks, ramps, and similar devices for positioning bulldozer blades or dump truck bodies.

When such actuating motors are provided with internal locking means for locking the piston relative to the cylinder on either one or both ends of the stroke of said piston, it is then possible to release the hydraulic pressure and stop the working of the hydraulic pump during such time as the actuator remains motionless. In known locking actuators, independently actuated means are used to lock and unlock the piston, requiring auxiliary fluid or electrical lines and auxiliary control valves, etc.

Accordingly, the principal object of the present invention is the provision of an internal locking actuator of the character described, in which the piston will be locked or unlocked automatically upon introduction of the pressure fluid without recourse to separate controls for such locking purposes.

Another important object of the present invention is the provision of an internal locking actuator in which the piston is not subjected to unequal stresses in the alternate lock positions thereof.

Yet another important object of the present invention is the provision of an internal locking actuator having essentially no external latching mechanism and having substantially the same size as that of contemporary double-acting pistons of the same load capacity.

Still another important object of the present invention is the provision of an internal locking actuator of the character described in which the effective lengths of the stroke of the piston are substantially equal to that of a conventional actuator of similar size that is not equipped with such internal locking device.

A still further important object of the present invention is the provision of an internal locking actuator of the character described in which there are means for automatically taking up any backlash of the piston and piston rod when in the locked position thereof.

Another object of the invention is to provide a double-acting actuator piston with dual-position locking means whereby it may be locked in both the retracted and extended positions thereof.

Another important object of the invention is to provide a double-acting actuator piston with a safety release feature whereby the locking mechanism may be freed upon fluid pressure failure and even upon jamming of the actuator due to other causes.

A substantial object of the invention is also the provision of an actuator of the character described which is of relatively simple construction suitable for adaptation to mass production techniques.

An ultimate object of the invention is also to provide an actuator with means giving indication of the locking and unlocking thereof.

A further important object of the invention is to provide an actuator of the character described wherein the piston may be locked relative to the cylinder without any expensive machining of the cylinder being required to provide such locking feature.

For a further appreciation of the aims and objects of the present invention, reference should be made to the ensuing disclosure and associated drawings wherein:

FIG. 1 is a partial longitudinal section of the improved actuator of the invention, taken along the plane A—A of FIG. 2.

FIG. 2 is a cross-sectional view of the actuator of FIG. 1, taken along the plane B—B of FIG. 1.

Referring now more particularly to the drawings in which like reference characters indicate like elements throughout, the actuator according to the present invention comprises a cylindrical sleeve 1, having a smooth inner bore 2 and provided with external threads 3 and 4 at its two ends for threaded engagement with the end caps 5 and 6 respectively. These end caps 5 and 6 may be axially adjusted relative to the cylindrical sleeve 1 by engaging, to a greater or lesser extent, the external threading 3 and 4 of the latter and may be locked in such adjusted position by any convenient locking means (not shown).

A piston 7 is housed within the sleeve 1 and arranged to be freely slideable therein from one position within the end cap 5 to another similar position within the end cap 6. The piston 7 is of a reversible, or double-acting, type, provided with dual faces 8 and 9 respectively and a piston rod 10 extending through the end cap 6 to the exterior of the actuator device. The cylindrical piston 7 is reduced to a square cross-sectional configuration in the regions 8' and 9' adjacent respective faces 8 and 9 of the piston, as best illustrated at 11 in FIG. 2.

The resulting flat sides 12 of the two square sections 11, 11' thus effectively form dual annular belts 8' and 9' of recesses or "flats" 12 wherein locking shoes 13 may conveniently be seated. Each segmental locking shoe 13 carries a latch member 14 extending inwardly therefrom through an associated hole 15 extending radially towards the longitudinal axis of piston 7 as evidenced from FIGS. 1 and 2 of the drawings.

In a similar manner axial bores 16 and 17 extend inwardly from respective faces 8 and 9 of the piston to communicate with said radial ports 15. A pair of plungers 18 and 19 are spring-biased into the respective bores 16 and 17 by associated biasing springs 20 and 20' respectively. Fluid lines 21 and 22 connect the respective end caps 5 and 6 to opposite ends of actuator cylinder 1 as in FIG. 1, whereby pressure fluid may be selectively applied to regions 8' and 9' of piston 7.

Proceeding now to the manner of operation of the invention; assume it is desired to extend actuator rod 10 from the retracted position of FIG. 1 to the fully extended position (not shown). To effect such an event pressure fluid is introduced at $P_e$ through "Extension" line 21 into the annular channel 23 effectively defined between end cap 5, piston 7, and the associated end of cylinder 1. This pressure fluid flows around the locking shoes 13 and their latching pins 14 through ports 15 and through some ports such as 15' into a terminal chamber 16', of slightly lesser diameter than that of bore 16. The axial pressure of such pressurized fluid within chamber 16 acts on the innermost face 24 of plunger 18, thereby forcing same axially outwards of piston 7 against the restraining action of its associated biasing spring 20.

Upon the resulting withdrawal of plunger 18 from the region 8', the latch elements 14 are able to move radially inwards along ports 15 towards the bore region 16, from which they have hitherto been excluded owing to the presence of plunger 18 therein. Such radially inward motion of latching pins 14 and their associated locking shoes 13 is caused by the pressure of the fluid within chamber 16', which acts to force piston 7 axially away from the retreating plunger 18 and towards the other end cap 6 of cylinder 1. Such initial movement of piston 7 causes lateral engagement with the rim of sleeve 1, which is bevelled as at 25 to exert a camming action on shoes 13 whereby they are forced radially inward until they become seated on their respective flats 12.

Immediately said seating is achieved shoes 13 have completely "cleared" the bevelled rim 25', unlocking action is thereby completed, and piston 7 commences travel towards the other end cap 6. Upon face 9 of the piston arriving close to end cap 6 the set of locking shoes 13' within region 9' are free to slide up the bevel 25' and into the annular chamber 23' defined between end cap 6, bevel 25', and the cylindrical outer surface of piston 7.

Such radial extension of locking shoes 13' results from insertion of plunger 19 into region 9' under the action of its associated biasing spring 20', whereby said plunger 19 effects contact with latching elements 13 therein and forces them radially outwards whereby their attached locking shoes 13' effect lateral contact with the other bevelled rim 25' of sleeve 1, thereby locking piston 7 against further axial movement from such "Extended" position of actuator rod 10. Thereafter the pressure supply is switched off and the "Extension" line 21 is re-connected to an "Exhaust" line, while piston 7 remains locked in the extended position of the actuator.

In order to retract the actuator rod 10 again it is only necessary to introduce pressure fluid at $P_r$ via "Retraction" line 22 into annular chamber 23', around locking shoes 13' and latching elements 14' integral therewith, and into chamber 17' whereby such pressure fluid acting on inner face 26 is effective to force plunger 19 out of region 9' against the restraining action of its bias spring 20' located within actuator rod 10 as shown in FIG. 1. As in the case of plunger 18, the pressure fluid within chamber 17' is also acting axially towards the center of piston 7, to return said piston to its retracted position within the other end cap 5 of the actuator. The resultant axial motion of piston 7 thus forces shoes 13' (along with their integral latching elements 14') down the inclined bevel 25' until they are seated upon their associated flats 12 and thus clear the internal diameter of sleeve 1. Thereafter the piston 7 is returned under the action of pressure fluid against its face 9, until the "Retraction" position within end cap 5 is reached, whereupon the now-unpressurized plunger 18 is received within bore 16 and thereby once again forces the four latching elements 14 to extend radially from region 8' of the piston to once more contact the bevelled end 25 of the actuator sleeve 1, and thereby lock the piston 7 in the "Retractive" position as has been illustrated in FIG. 1. To facilitate the necessary radial extension of shoes 13 upon re-entry of plunger 18 into bore 16, the latching pins 14 are provided with arcuate surfaces 27 disposed towards plunger 18, corresponding arcuate surfaces 27' being employed to exert a similar camming action upon plunger 19. It will be noted that the locking shoes 13 will ride outwardly along bevelled rim 25 until piston face 8 comes up against end cap 5, thereby taking up any "lost-motion" or backlash.

A safety release feature is also provided to obviate any possibility of the actuator becoming jammed in "Retractive" condition of FIG. 1 (as due to fracture of a fluid line, freezeup, etc.), the fluid operated plunger 18 is provided with a mechanical back-up device in the form of a lever 28 which is pivotal about a fulcrum 29 by means of linkage F. Lever 28 terminates in a pair of splayed ends 30 forming a yoke on the other side of fulcrum 29 from of linkage F. Lever 28 terminates in a pair of splayed ends 30 of said yoke and is firmly fastened to plunger 18. By pulling on link F it is therefore possible to rotate lever 28 in an anticlockwise direction about fulcrum 29, whereby splayed end 30 of said lever contacts the underface of head 32 of bolt 31, thereby prying plunger 18 out of bore 16 against the restraining action of its biasing spring 20 and any abnormal frictional forces present, whereby latches 14 are unlocked, locking shoes 13 become released, and piston 7 is free to travel along sleeve 1 to "Extended" position under the action of its own weight or any equipment which happens to be coupled thereto.

A further advantage of the invention lies in the novel indicating means provided whereby correct operation of the device is monitored. These novel indicator devices 33 are shown integrally attached to respective end caps 5 and 6, although any other suitable means of attachment may be employed such as by threading, etc. Each said indicating device 33 has a central bore 34 formed therein which contains a bobbin 35 freely slideable therein. Respective biasing springs 36 are employed to bias valve bobbin 35, whereby said bobbin projects into respective ends caps 5, 6 in the absence of piston 7 therein, and each valve bobbin 35 is arranged to carry a contact 37 which extends through a lateral slot 38 in the wall of device 33. It is therefore apparent that upon entry of double-acting piston 7 into (for example) end cap 6, the resulting presence of locking shoes 13' within annular chamber 23' will be effective to force bobbin 35' back within bore 34' against the action of biasing spring 36' whereby moveable contact 37' will be caused to bridge fixed contacts 39, which may be attached to a pilot light or similar means for indicating that piston 17 has reached the fully-extended position. Such a condition of bobbin 35 is shown in FIG. 1 wherein the piston 7 is present in end cap 5, and the associated valve bobbin 35 is seen to be causing bridging on the fixed contact 35 thereat.

To insure that the valve bobbins 35 are responsive solely to contact with locking shoes 13, rather than to pressure fluid, axial vents 40 are provided through the bobbins to equalize their pressure on both sides thereof and prevent the presence of fluid pressure differentials from giving rise to spurious indication. A similar bleed hole 41 may be employed leading from behind plunger 19 through actuator rod 10 to atmosphere, to obviate any possibility of fluid leakage from chamber $17^1$ past plunger 19 to the region of bias spring $20^1$ in known manner. Flanges or lugs 42 and 43 respectively are provided on actuator rod 10 and end-cap 5, whereby the actuator may be coupled to the appropriate linkages of the undercarriage or other mechanism.

It will thus be apparent from the foregoing that the invention provides a simple and compact, yet extremely effective linear actuator which is lockable in both of its dual positions and capable of emergency release even following loss of the motive fluid pressure.

It will also be evident that the invention gives positive indication of the actual position of the double-acting actuator piston, whether same is in the retracted or extended condition or at some location intermediate said extreme positions. It will likewise be realized that by utilizing the end rims of the actuator piston as the detent means for the locking shoes, considerable economy in manufacture is achieved, in that no special machining or similar operations are required to form such detents.

While the invention has peen described principally with the piston rod shown locked in retracted position, it will be obvious that the arrangement for locking the piston rod in extended position is essentially similar. Thus it will be realized that while a preferred embodiment of the invention has been illustrated and described, various analogous modifications may be resorted to without departing from the spirit and scope of the invention as set forth in the appended claims.

We claim:

1. An end lock mechanism for an actuator of the type comprising a piston reciprocably slidable within a cylinder under the influence of fluid under pressure admitted alternatively at opposite ends of the cylinder and thus applied alternatively to opposite faces of the piston, one face of said piston presenting an axial piston rod which when said piston is retracted extends through and beyond the corresponding end of the cylinder, which end lock mechanism comprises an annular belt of recesses formed in the outer surface of said piston adjacent to each face thereof, a segmental locking shoe disposed in each of said recesses for sliding radial displacement therein from a retracted position in which the outer surface of said segmental shoe is in alignment with the adjacent surface of the piston to an extended position wherein the said segmental shoe is in locked engagement with a corresponding rim of said cylinder, said locked engagement causing locking of said piston relative to said cylinder, whereof the shoes within one of said belts of recesses engage with a rim on said cylinder when the said piston is in extended position and the shoes within the other of said belts of recesses engage with another rim on said cylinder when said piston is in retracted position, said locking mechanism being characterized in that the radial extension of the segmental shoes within either of said belts is ensured by the engaging axial penetration between the inner ends of said shoes, of a spring biased plunger, the spring biased plunger which engages the shoes of the belt adjacent the free end of the piston being fluid tightly received in a cylindrical axial bore at the free end of the cylinder for spring biased axial displacement therein, the spring biased plunger which engages the shoes of the belt adjacent the rod end of the piston being fluid tightly received in an internal axial bore of the piston, the inner ends of the shoes projecting inwardly into said internal bore adjacent its inside end, fluid pressure communication being assured between the inside end of the internal bore and the rod side of the piston, the outside end of the internal bore being vented to atmosphere by means of an appropriate connecting conduit inside said piston rod.

2. An end lock mechanism as claimed in claim 1, wherein the spring biased plunger dependent on the free end of the cylinder is coupled by means of an appropriate linkage with a manually operable leverage system outside the cylinder, whereby it may be manually pulled out of locking position to effect a release of the piston from its locked retracted position.

3. An end lock mechanism as claimed in claim 2, wherein indicator means, sensitive to the radial position of the shoes when engaged with either of the rims is provided, each indicator consisting of a radial bore extending outwardly from the bottom of each rim, a spring biased or auxiliary plunger slidable in said radial bore, a limiting flange at the inner end of said bore and an uninterrupted pressure balancing communication between opposite ends of each said auxiliary plungers, each said plunger being connected intermediate the ends thereof to a position sensing electrical switch means whereby an electrical indicator circuit is closed when the auxiliary plunger is pushed outwardly by one of the shoes, and opened when the shoes are retracted.

4. An end lock mechanism as claimed in claim 1, wherein each said rim is provided with an inwardly directed conical bevel, said bevel being effective to assist retraction of said shoes into said recesses flush with the cylindrical wall of said piston, said shoes upon extension against said bevel being effective to cam the face of said piston against the respective end of the cylinder whereby backlash is taken up.

5. An end lock mechanism as claimed in claim 1, wherein said segmental locking shoes when in radially extended position are effective to activate indicator means, said shoes when returned to retracted position being effective to deactivate said indicator means.

References Cited by the Examiner
UNITED STATES PATENTS

| | | | |
|---|---|---|---|
| 2,295,961 | 9/42 | Meyer | 92—5 |
| 2,434,828 | 1/48 | Ashton et al. | 92—21 |
| 2,744,501 | 5/56 | Chace | 92—25 |
| 2,813,518 | 11/57 | Driskel et al. | 92—21 |
| 3,008,454 | 11/61 | Wilkins | 92—24 |

FOREIGN PATENTS 715,739  1/42  Germany.

RICHARD B. WILKINSON, *Primary Examiner.*